United States Patent
Aikawa

(10) Patent No.: US 7,870,941 B2
(45) Date of Patent: Jan. 18, 2011

(54) FRICTION ENGAGING DEVICE

(75) Inventor: Masashi Aikawa, Tochigi (JP)

(73) Assignee: GKN Driveline Torque Technology KK, Tochigi-ken (JP)

( * ) Notice: Subject to any disclaimer, the term of this patent is extended or adjusted under 35 U.S.C. 154(b) by 286 days.

(21) Appl. No.: 11/216,540

(22) Filed: Aug. 31, 2005

(65) Prior Publication Data

US 2006/0046890 A1 Mar. 2, 2006

(30) Foreign Application Priority Data

Aug. 31, 2004 (JP) ............................ P. 2004-251743

(51) Int. Cl.
*F16D 11/00* (2006.01)
(52) U.S. Cl. ................................ 192/107 M
(58) Field of Classification Search .................. 192/35, 192/113.34, 70.14; 475/230, 160, 231, 238
See application file for complete search history.

(56) References Cited

U.S. PATENT DOCUMENTS

| | | | | |
|---|---|---|---|---|
| 3,282,746 A | * | 11/1966 | Zlotek et al. | 428/622 |
| 3,654,692 A | * | 4/1972 | Goetz | 29/558 |
| 4,242,151 A | * | 12/1980 | Leveque | 148/217 |
| 5,029,686 A | * | 7/1991 | Yesnik | 192/70.14 |
| 5,048,654 A | * | 9/1991 | Yesnik | 192/70.14 |
| 5,583,095 A | * | 12/1996 | Kobayashi et al. | 508/207 |
| 6,109,408 A | * | 8/2000 | Ikeda et al. | 192/35 |
| 6,460,674 B1 | * | 10/2002 | Clay | 192/70.14 |
| 6,510,932 B2 | * | 1/2003 | Ikeda et al. | 192/54.4 |
| 7,005,177 B2 | * | 2/2006 | Takakura et al. | 428/141 |
| 7,240,748 B2 | * | 7/2007 | Kira et al. | 180/65.2 |
| 2003/0000794 A1 | * | 1/2003 | Hofer et al. | 192/107 M |
| 2003/0106758 A1 | * | 6/2003 | Hirota et al. | 192/35 |
| 2003/0106759 A1 | * | 6/2003 | Sakai et al. | 192/35 |
| 2003/0108711 A1 | * | 6/2003 | Hisada et al. | 428/64.4 |
| 2004/0134736 A1 | * | 7/2004 | Ando et al. | 192/35 |
| 2005/0167225 A1 | * | 8/2005 | Sakai et al. | 192/35 |

FOREIGN PATENT DOCUMENTS

EP 1 323 942 A1 2/2003
JP 2003-113874 4/2003

OTHER PUBLICATIONS

English Patent Abstract of JP2003113874 from esp@cenet, published Apr. 18, 2003, 1 page.
German Office Action for German Patent Application No. 10 2005 041 080.4-12, mailed Mar. 13, 2007, and English translation thereof, 7 pages.

* cited by examiner

*Primary Examiner*—David D Le
*Assistant Examiner*—Justin Holmes
(74) *Attorney, Agent, or Firm*—Osha Liang LLP

(57) ABSTRACT

An outer plate 31, which is used under a lubricated environment of a differential gear oil including a friction adjuster, is made of a SC tempered material which is subjected to nitriding treatment to suppress chemical adsorption of the friction adjuster. An inner plate 33 has paper on a surface thereof. The outer plate 31 and the inner plate 33 are provided to apply or release the torque between an outer differential case 3 and an inner differential case 5 of a rear differential device 1 having the outer differential case 3 and the inner differential case 5 capable of relatively rotating to the inside and the outside.

14 Claims, 5 Drawing Sheets

FRICTION ENGAGING DEVICE

The present application claims foreign priority based on Japanese Patent Application No. P.2004-251743, filed on Aug. 31, 2004, the contents of which are incorporated herein by reference.

BACKGROUND OF THE INVENTION

1. Field of the Invention

The present invention relates to a friction engaging device which is used for applying or releasing a torque supplied from a driving force source.

2. Related Art

Disclosed in JP-A-2003-113874 is a friction engaging device applied to an electric motor driving device. The electric motor driving device decelerates an output of an electric motor and transmits the decelerated output to right and left axle shafts for driving rear right and left wheels. An electric motor is used as a sub-driving source. Front wheels use an engine such as an internal combustion engine as a main driving source, thus front right and left wheels are driven by the engine.

In the electric motor driving device, a first power transmission shaft is rotatably supported to a fixed housing. The first power transmission shaft is interlockingly connected with the electric motor so as to receive the input torque from the electric motor. A first reduction gear constituting a first reduction mechanism is provided in the first power transmission shaft. A second reduction gear of the first reduction mechanism located on the other side is engaged with the first reduction gear. The second reduction gear is supported to a second power transmission shaft. The second power transmission shaft is arranged in parallel to the first power transmission shaft and rotatably supported to the housing.

A third reduction gear constituting a second reduction mechanism is provided in the second power transmission shaft. A fourth reduction gear of the second reduction mechanism located on the other side is engaged with the second reduction gear. The fourth reduction gear is supported to relatively rotate about a differential case of a rear differential device by a bearing.

The rear differential device supports a differential gear mechanism in the differential case. The differential case is rotatably supported to the housing by a bearing.

Switching to apply and release the torque between the fourth reduction gear and the differential case is performed in a main clutch constituted by using a multi friction plate of an electromagnetic friction clutch.

If the electromagnetic friction clutch is in a torque transmission state, the reduced torque is transmitted to the rear differential device via the first and second reduction mechanisms by driving the electric motor. The torque is transmitted to the right and left axle shafts from the rear differential device. The torque assists an engine driving in a launch driving or a climb driving.

However, an outer plate of the electromagnetic friction clutch is formed in, for example, a friction plate made of a SC material (carbon steel) and a surface of an inner plate thereof is formed in a friction plate having a friction material such as a paper or a carbon, or the like. Further, generally, a friction engaging device of a driving force transmission system such as the electromagnetic friction clutch is under a lubricated environment by a lubricant including a friction adjuster (FM material, a friction modifier).

Therefore, because the FM material included in a lubricant is chemically adsorbed into the surface of the outer plate made of the SC material and the surface thereof is activated, depending on a temperature environment, there is a problem in which a friction coefficient thereof is declined.

SUMMARY OF THE INVENTION

One or more embodiments of the present invention solve the problem that the FM material included in a lubricant is chemically adsorbed into the friction engaging surface and a friction coefficient thereof is declined, depending on the temperature of the environment.

In accordance with one or more embodiments of the present invention, in order to suppress a decline of a friction coefficient without being influenced by a temperature of the environment, a surface layer for suppressing chemical adsorption of a friction adjuster is formed on at least one side of a friction engaging member.

In accordance with one or more embodiment of the present invention, a friction engaging device is provided with a surface layer for suppressing chemical adsorption of a friction adjuster formed on at least one side of a friction engaging member. Therefore, it is possible to suppress chemical adsorption of the friction adjuster in the friction engaging member without being influenced by the change of the temperature of the environment. As a result, it is possible to suppress a friction coefficient of the friction engaging member from declining and perform the secure friction coupling.

In accordance with one or more embodiment of the present invention, a friction engaging member may be formed of a steel product containing an iron component. Therefore, it is possible to secure the strength of a friction engaging member and to easily reduce or exclude an iron component by heat treatment, deposition, painting, plating, and reforming a connective tissue of a surface of a steel product.

In accordance with one or more embodiments of the present invention, the surface layer may be subjected to surface treatment. Therefore, it is possible to easily form the surface layer.

In accordance with one or more embodiments of the present invention, the surface treatment may be a nitriding treatment. Therefore, it is possible to reliably suppress chemical adsorption of a friction adjuster.

In accordance with one or more embodiments of the present invention, the friction engaging device may be provided in a driving path of a vehicle. Therefore, it is possible to set the absolute rotation number or the relative rotation number of a pair of rotation members (that is, a pair of friction engaging members) of the friction engaging device to be low, compared to the driving rotation number of a motor. As the upper limit of a rising temperature of a lubricant can be controlled, it is possible to set a lower temperature area. That is, it is possible to use the friction engaging device in an area having high transmission torque.

In accordance with one or more embodiments of the present invention, the friction engaging member may be provided to apply or release the torque between an outer differential case and an inner differential case of a differential device having the outer differential case and the inner differential case capable of relatively rotating to the inside and the outside. Therefore, the torque transmitted to the outer differential case of the differential device is reliably transmitted to the inner differential case via the friction engaging members, and thus the torque which has passed through the differential device can be securely transmitted.

In accordance with one or more embodiments of the present invention, one side of the friction engaging members is a friction plate formed of the steel product and the other side thereof is a friction plate having a friction material on the surface. Therefore, a chemical adsorption surface is confined to one plate by a surface layer of one side and a friction material of the other side, so as to securely suppress chemical adsorption of a friction adjuster in a friction coupling surface of a friction plate formed of the steel product.

Further, in accordance with one or more embodiments of the present invention, a friction engaging device is provided with: a first friction engaging member formed of a steel product; a second friction engaging member, wherein the first friction engaging member and the second friction engaging member are relatively rotatable; and a surface layer formed on the first friction engaging member and treated by nitriding treatment.

In accordance with one or more embodiments of the present invention, an object to suppress a friction coefficient from declining without being influenced by a temperature of the environment is realized by a surface treatment.

Further, in accordance with one or more embodiment of the present invention, the friction engaging device may be disposed in an individual housing separately mounted from a housing adjacent to an engine on the vehicle, and the friction engaging device may be mounted in a differential device that transmits the driving torque to an auxiliary driven wheel. That is, the individual housing that accommodating the friction engaging device is not arranged adjacent to the engine of the vehicle. Therefore, the friction engaging device is prevented from being heated by the engine. Moreover, the individual housing may be individually cooled. As a result, it become more preferable that the friction engaging device is used in a condition where the chemical adsorption of the friction adjuster to the surface of the friction engaging member is originally suppressed. Further, in this case, the friction engaging device is used for applying or releasing the driving torque at the differential device for the auxiliary driven wheels. Therefore, the friction engaging device can be used for applying or releasing the driving torque in a prescribed conditions and it is possible to keep the lubricant in a lower temperature condition.

Other aspects and advantages of the invention will be apparent from the following description and the appended claims.

BRIEF DESCRIPTION OF THE DRAWINGS

FIGS. 3A to 3C are graphs illustrating current flow experiment results, wherein FIG. 3A is a graph illustrating a rotation difference $\Delta N=1$ rpm between an outer plate and an inner plate, FIG. 3B is a graph illustrating the rotation difference $\Delta N=10$ rpm therebetween, and FIG. 3C is a graph illustrating the rotation difference $\Delta N=20$ rpm therebetween (first embodiment).

FIGS. 4A to 4C are graphs illustrating current flow experiment results, wherein FIG. 4A is a graph illustrating a rotation difference $\Delta N=1$ rpm between an outer plate and an inner plate, FIG. 4B is a graph illustrating the rotation difference $\Delta N=10$ rpm therebetween, and FIG. 4C is a graph illustrating the rotation difference $\Delta N=20$ rpm therebetween (first embodiment).

DESCRIPTION OF THE PREFERRED EMBODIMENTS

Embodiments of the invention will be described with reference to the accompanying drawings.

First Embodiment

Figure 1:
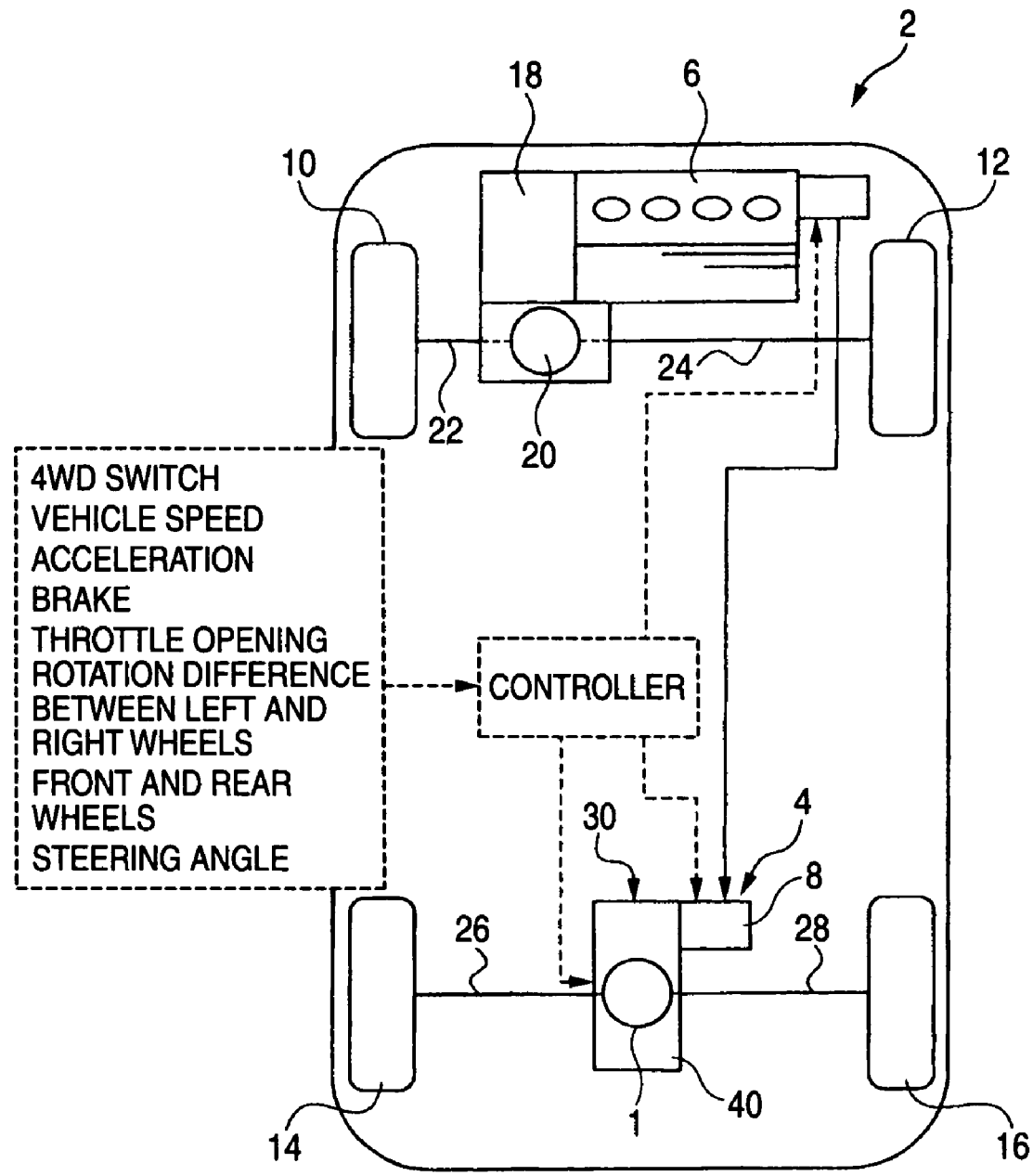
FIG. 1 is a plan view illustrating a skeleton of an electric assist type car (first embodiment).
Figure 2:
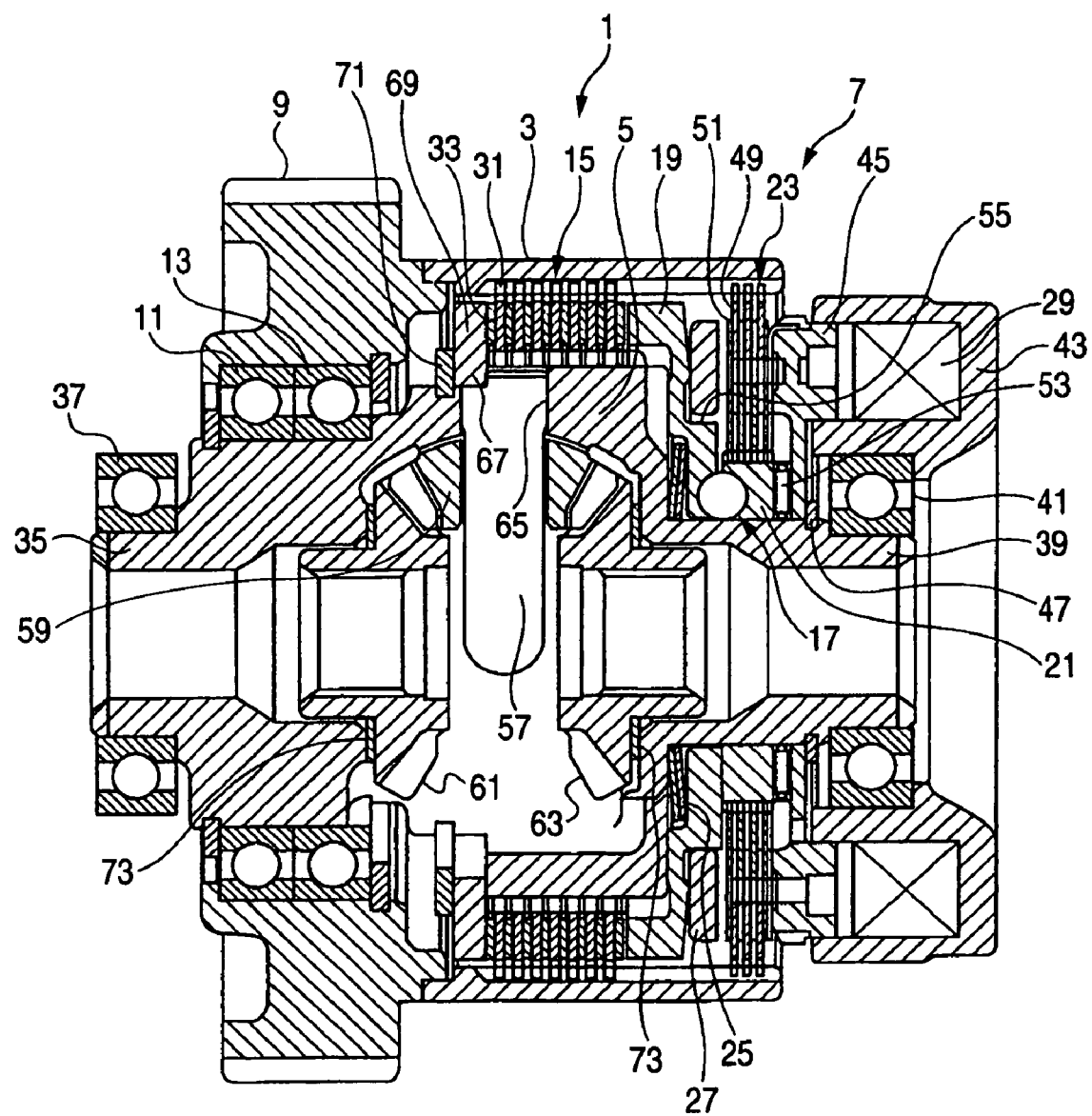
FIG. 2 is a cross-sectional view of a rear differential device (first embodiment).

FIG. 1 is a top plan view illustrating a skeleton of an electric assist type car 2 to which a rear differential device 1 that is a friction engaging device according to a first embodiment of the present invention is applied. The friction engaging device is applied to, for example, an electric motor driving device 4 of the car 2.

A main driving source of the car 2 is an engine 6 that is an internal combustion engine and a sub-driving source thereof is an electric motor 8. The engine 6 drives front right and left wheels 10 and 12 (primary driven wheels 10 and 12) and the electric motor 8 drives rear right and left wheels 14 and 16 (auxiliary driven wheel 14 and 16). The output of the engine 6 is transmitted to the front wheels 10 and 12 through a transmission 18 and then through a front differential device 20 that is a differential device, and then through right and left axle shafts 22 and 24. The transmission 18 is disposed in a housing adjacent to the engine. The electric motor 8 is constituted as a driving source of the electric motor driving device 4 and a driving force is transmitted to a rear differential device 1 by reducing the rotation number of the electric motor 8 rotating at a high speed by a reduction device through a plurality of steps of the gear function. The rear differential device 1 is disposed in a housing 40 individually and separately mounted from the housing adjacent to the engine 6 accommodating the transmission 18. The output side of the electric motor driving device 4 is interlockingly connected with the rear right and left wheels 14 and 16 through right and left axle shafts 26 and 28.

The rear differential device 1 is driven through a reduction mechanism 30 by the output of the electric motor. The right and left axle shafts 26 and 28 are interlockingly connected to the rear differential device 1.

The rear differential device 1 includes the outer differential case (one rotation member) 3 and the inner differential case (the other rotation member) 5 capable of relatively rotating to the inside and the outside, and an applying/releasing device 7 for applying or releasing the torque between the outer differential case 3 (outer member 3) and the inner differential case 5 (inner member 5).

The applying/releasing device 7 includes operational elements such as a main clutch 15 having multi-plates which is provided between the outer differential case 3 and the inner differential case 5, a ball cam 17 serving as an actuator of the main clutch 15 having a clutching function, a pressure plate 19, a cam ring 21, a pilot clutch 23 having multi-plates, a return spring 25, an amateur 27, and an electromagnet 29 whose current flow is controlled by a controller.

The main clutch 15 is composed of an outer plate 31 and an inner plate 33. The outer plate 31 and the inner plate 33 are friction engaging members which are frictionally engaged with each other and one thereof is a friction plate formed of a steel product, for example, a SC tempered material and the other thereof is a friction plate having a paper attached as the friction member on the surface thereof.

Each of the outer plate 31 is subjected to surface treatment so that a surface layer for suppressing chemical adsorption of the friction adjuster is formed on the plate surface. The surface treatment is to subject the surface of the outer plate 31 to nitriding treatment after grinding it in order to suppress chemical adsorption of the friction adjuster (FM material). Further, the main object of the grinding is to form the surface of the outer plate 31 such that the surface of the outer plate 31 has predetermined roughness and to suppress the judder from being generated when sliding between the inner plate 33 and the outer plate 31 has taken place, therefore, the grinding is not an essential process in the present invention.

The outer plate 31 is spline-engaged with the outer differential case 3 and the inner plate 33 is spline-engaged with the inner differential case 5. A torque can be transmitted between the outer differential case 3 and the inner differential case 5 by friction-engaging between the outer plate 31 and the inner plate 33, and the friction engaging device is composed of the outer differential case 3, the inner differential case 5, the outer plate 31, and the inner plate 33.

A ring gear 9 receiving the torque from the electric motor is provided in the outer differential case 3. The ring gear 9 of the outer differential case 3 is supported on the inner differential case 5 by ball bearings 11 and 13. The outer differential case 3 performs only the function for torque transmission by the ring gear 9 and has a floating structure released from a supporting function of the member.

In the inner differential case 5, one boss 35 is supported to a cover by a ball bearing 37, and the other boss 39 is supported to a main body of a casing through a ball bearing 41 and a core 43 of an electromagnet 29. The core 43 is fixed to the main body of the casing.

A rotor 45 made of a magnetic material is fixed to an outer circumference of the boss 39 by a snap ring 47 and positioned in the axis direction.

The pilot clutch 23 is provided with an outer plate 49 and an inner plate 51, and arranged between the outer differential case 3 and the cam ring 21. The outer plate 49 is spline-connected to an inner circumference of the outer differential case 3, and the inner plate 51 is spline-connected to the outer circumference of the cam ring 21.

The ball cam 17 is arranged between a pressure plate 19 and the cam ring 21. Because the pressure plate 19 is spline-engaged with the outer circumference of the inner differential case 5 so as to move in the axis direction, and the pressure plate 19 receives a cam thrust force of the ball cam 17 so as to press the main clutch 15.

Further, a thrust bearing 53 for receiving a reaction force of the ball cam 17 and absorbing the relative rotation between the cam ring 21 and the rotor 45 is arranged between the cam ring 21 and the rotor 45.

The return spring 25 is arranged between the pressure plate 19 and the inner differential case 5, and the return spring 25 urges the pressure plate 19 in the connection release direction of the main clutch 15.

The amateur 27 is formed in a ring shape and is arranged to move in the axis direction between the pressure plate 19 and the pilot clutch 23. Further, the inner circumference of the amateur 27 is arranged to relatively rotate in an outer circumference of a stepped portion 55 formed to the pressure plate 19.

A proper air gap is formed between the core 43 of the electromagnet 29 and the rotor 45, and a magnetic path of the electromagnet 29 is formed by the air gap, the rotor 45, the pilot clutch 23, and the amateur 27.

A differential mechanism consisting of a pinion shaft 57, a pinion gear 59, and side gears 61 and 63 of the output side, etc. is provided in the inner differential case 5.

The pinion shaft 57 is formed in a radial shape from the rotation center of the inner differential case 5, each front end thereof is engaged with a engaging hole 65 of the inner differential case 5, and a pressure receiving plate 69 is inserted into a stepped portion 67, thus its rotation is prevented. The pressure receiving plate 69 is positioned by a stopper ring 71.

The pinion gear 59 is rotatably supported on the pinion shaft 57, respectively, and the side gears 61 and 63 are engaged with the pinion gear 59 from the left and right side. A thrust washer 73 for receiving an engaging reaction force of the side gears 61 and 63 is arranged between each of the respectively side gears 61 and 63 and the inner differential case 5.

The side gears 61 and 63 are spline-connected to the right and left axle shafts, respectively, and the respective axle shafts are connected to the rear right and left wheels.

Differential gear oil that is a lubricant is received within the casing which receives and supports the rear differential device 1, and the main clutch 15 and the differential mechanism, etc. are under a lubricated environment of the differential gear oil. The friction adjuster (FM material) is included in the differential gear oil.

Hereinafter, the operation will be described.

By controlling the current flow to the electromagnet 29, a magnetic flux loop is formed, the amateur 27 is pulled by the magnetic flux loop, and thus the pilot clutch 23 is fastened. By the fastening, the cam ring 21 is engaged with the outer differential case 3 side in the rotation direction. The pressure plate 19 to be engaged with the inner differential case 5 side relatively rotates about the cam ring 21, and the thrust force is generated by operating the ball cam 17. The reaction force of the thrust force is transmitted to the inner case 5 via the thrust bearing 53, the rotor 45, the snap ring 47, and the thrust force is smoothly applied to the pressure plate 19. By the operation of the thrust force, the pressure plate 19 moves so as to fasten the main clutch 15. The main clutch 15 transmits a torque, for example, to the inner differential case 5 from the outer differential case 3 corresponding to a fastening force.

Therefore, it is possible to transmit a torque of an electric motor which is reduced and transmitted by means of the ring gear 9 to the rear wheel side through the rear differential device 1 corresponding to the fastening force of the main clutch 15.

In such an operating state, the differential gear oil gradually becomes a high temperature. Even if there is a temperature change, as described above, each of the outer plates 31 is subjected to surface treatment by nitriding-treating after grinding, and thus a surface layer made of a nitride in which the content of an iron component Fe is sharply reduced more than a base material of a steel product is formed on the plate surface, so that if a current flow control condition of the electromagnet 29 is the same, the transmission torque of the main clutch 15 is prevented from declining. Further, it is possible to form an oxide layer on the surface of the surface layer of the nitride depending on a kind or a method of the nitriding treatment. In this case, it is very effective to suppress chemical adsorption by a friction adjuster and the oil retention ability is high. A nitride layer, a nitrogen diffusing layer, or an oxide layer has a connective tissue having a higher coupling force than a chemical adsorption force of the friction adjuster.

Figure 3A:
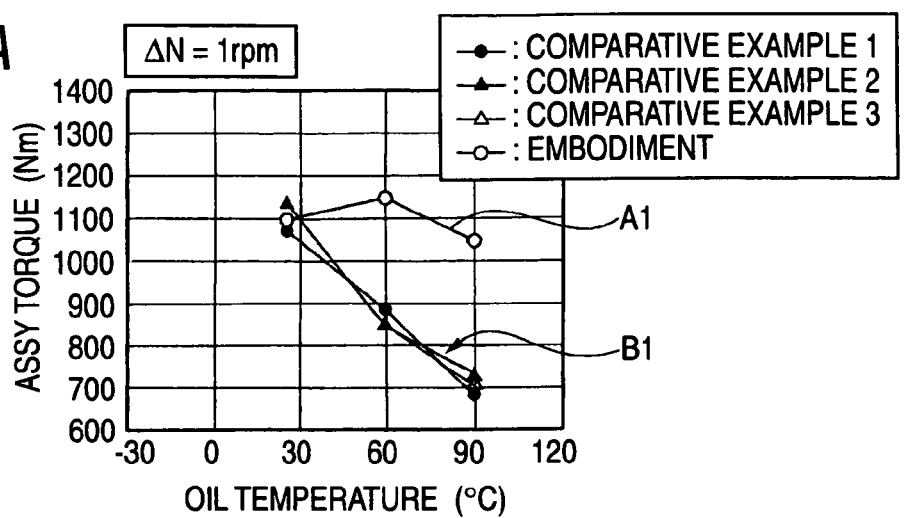
Figure 3B:
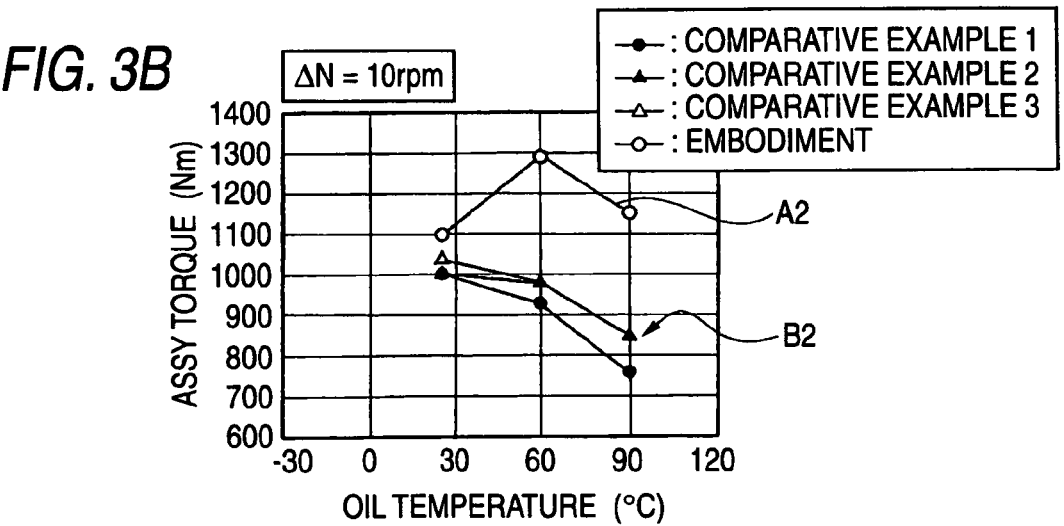
Figure 3C:
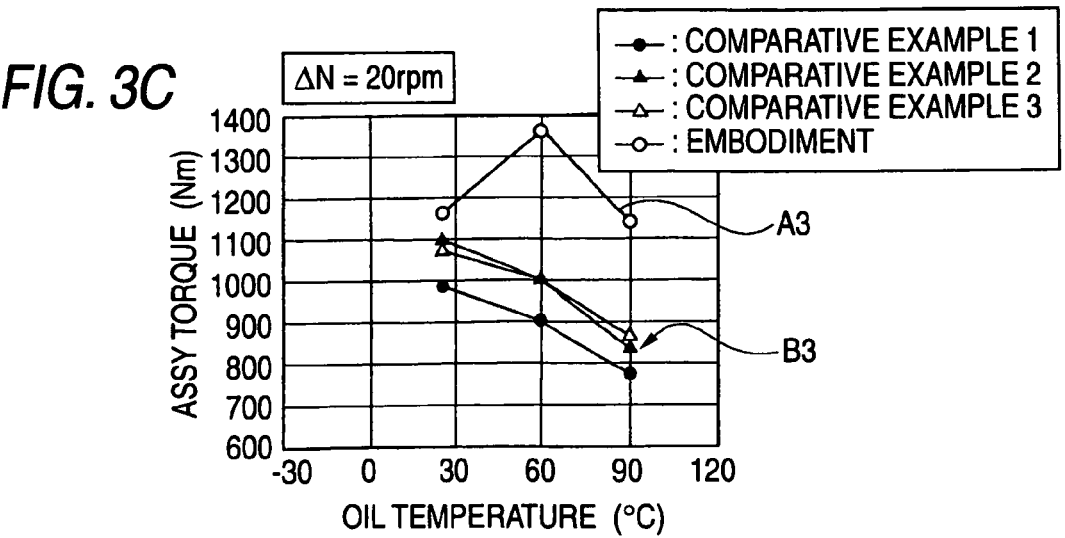
Figure 4A:
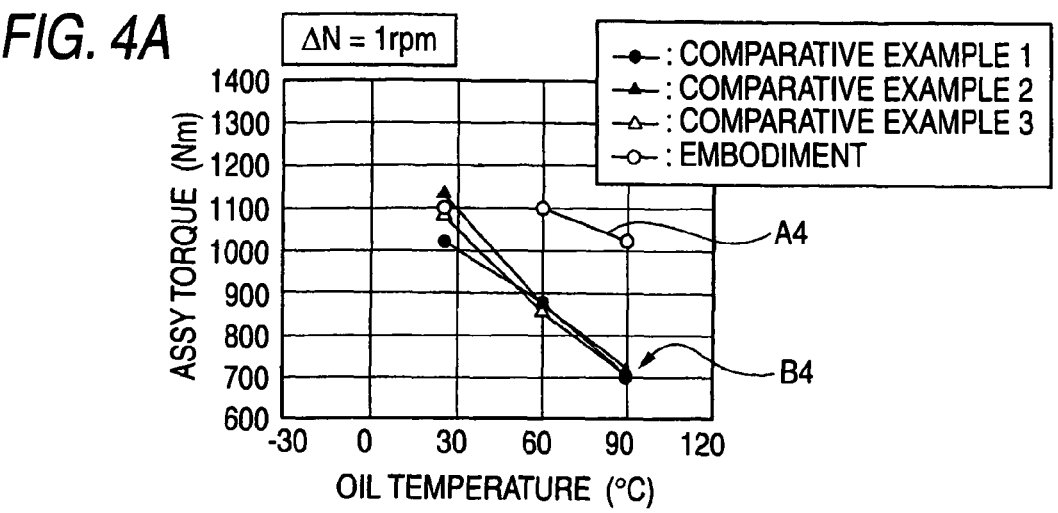
Figure 4B:
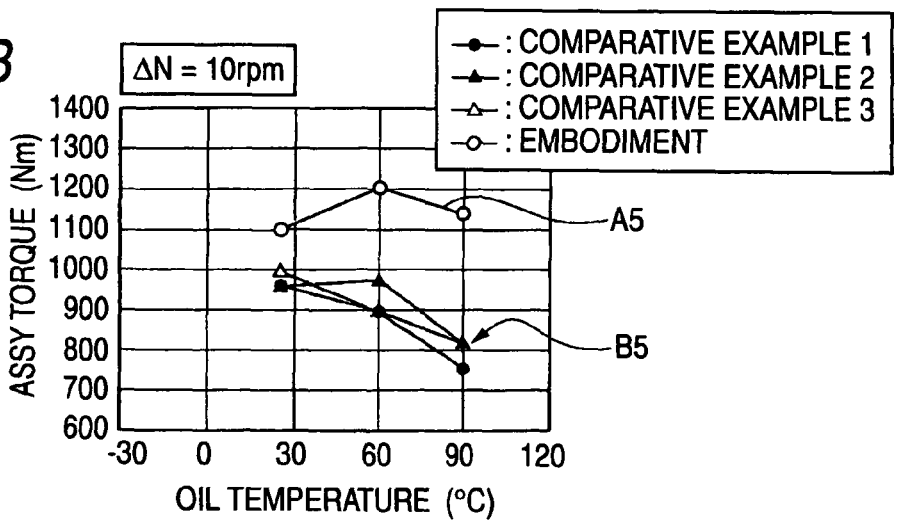
Figure 4C:
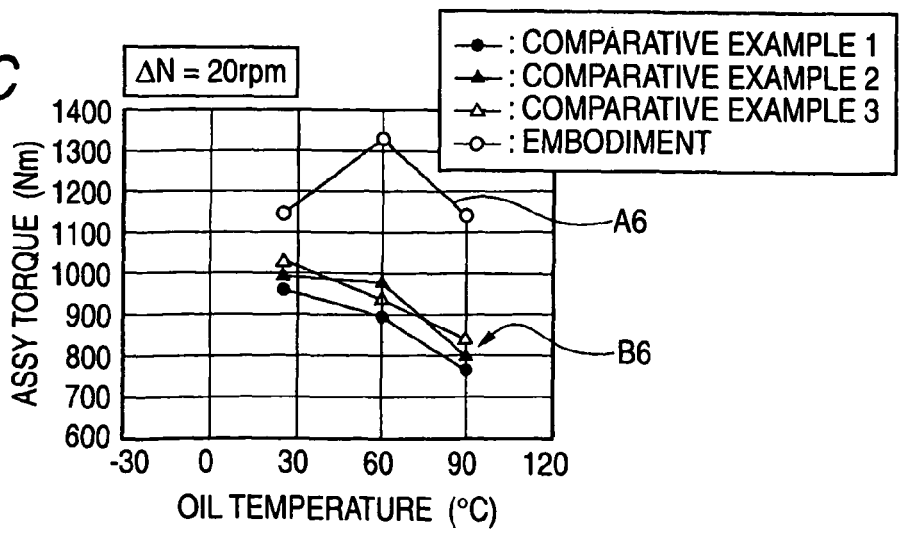

FIGS. 3A to 3C and 4A to 4C are graphs illustrating current flow experiment results, where they show results that a current flow ampere which is supplied to the electromagnet 29 is changed and a current flow ampere of FIGS. 3A to 3C is higher than that of FIGS. 4A to 4C. The horizontal axis indicates the oil temperature change in the differential gear oil and the longitudinal axis indicates the change in the transmission torque between the ring gear 9 and the side gears 61 and 63. FIGS. 3A and 4A are graphs illustrating a rotation difference ΔN=1 rpm between the outer plate 49 and the inner plate 51, FIGS. 3B and 4B are graphs illustrating a rotation difference ΔN=10 rpm therebetween, and FIGS. 3C and 4C are graphs illustrating a rotation difference ΔN=20 rpm therebetween. As shown in FIGS. 3A, 3B, 3C, 4A, 4B, and 4C, A1 to A6 are results of embodiments of the present invention and B1 to B6 are results of three kinds of samples (comparative examples) produced in a case where there is no surface treatment by nitriding treatment.

As shown in FIGS. 3A, 3B, 3C, 4A, 4B, and 4C, in B1 to B6, the transmission torque sharply declines with the rise of the oil temperature. As the FM material among the differential gear oil is gradually activated with the rise of the oil temperature and chemically adsorbed in an iron component Fe on the surface of the outer plate 31 made of the SC material, in which an activation film is produced, the above decline is due to the decline of the friction coefficient between the inner plate 51 and paper of the surface. Therefore, in the embodiment of the present invention, as shown in FIGS. 3A, 3B, 3C, 4A, 4B, and 4C, in every case of A1 to A6, the transmission torque changes such that the peak of the transmission torque is shown at a specific temperature while temperature is rising.

In this way, when nitriding treatment is performed as in the embodiment of the present invention, the transmission torque does not sharply decline when the temperature rises. Further, since the transmission torque changes such that the peak of the transmission torque is shown while the temperature is rising within the range of the oil temperature used in the friction engaging device, it is possible to suppress the decline of the transmission torque as a whole. That is, it is possible to supply a device having a stable characteristic by using the friction engaging device of the present invention when using the oil temperature range capable of obtaining peak torque.

That is, chemical adsorption of the friction adjuster into the outer plate 49 is suppressed without being influenced by the change of the temperature of the environment because the outer plate 49 is formed of the SC tempered material which is subjected to nitriding treatment to suppress chemical adsorption of the friction adjuster. That is, it is possible to suppress an activated film from being formed through chemical reaction between the iron component on the surface of the outer plate 49 and the activating FM material. Therefore, it is possible to suppress a friction coefficient from declining between the outer plate 49 and the inner plate 51, so that a secure friction-engaging can be performed.

As shown in FIGS. 3A to 3C and 4A to 4C, because an activation operation of the FM material is insufficient in an oil temperature that is lower than 30° C. and a chemical adsorption operation of the FM material (attacking force against an iron component Fe) is stagnant in an oil temperature of 90° C. or more, those temperatures are excluded from the measurement.

Second Embodiment

The present invention may be applied to a coupling arranged in the input side of a final reducer (employing the pair of reduction gears composed of a pair of bevel gears, as a general structure) of the differential device.

Figure 5:
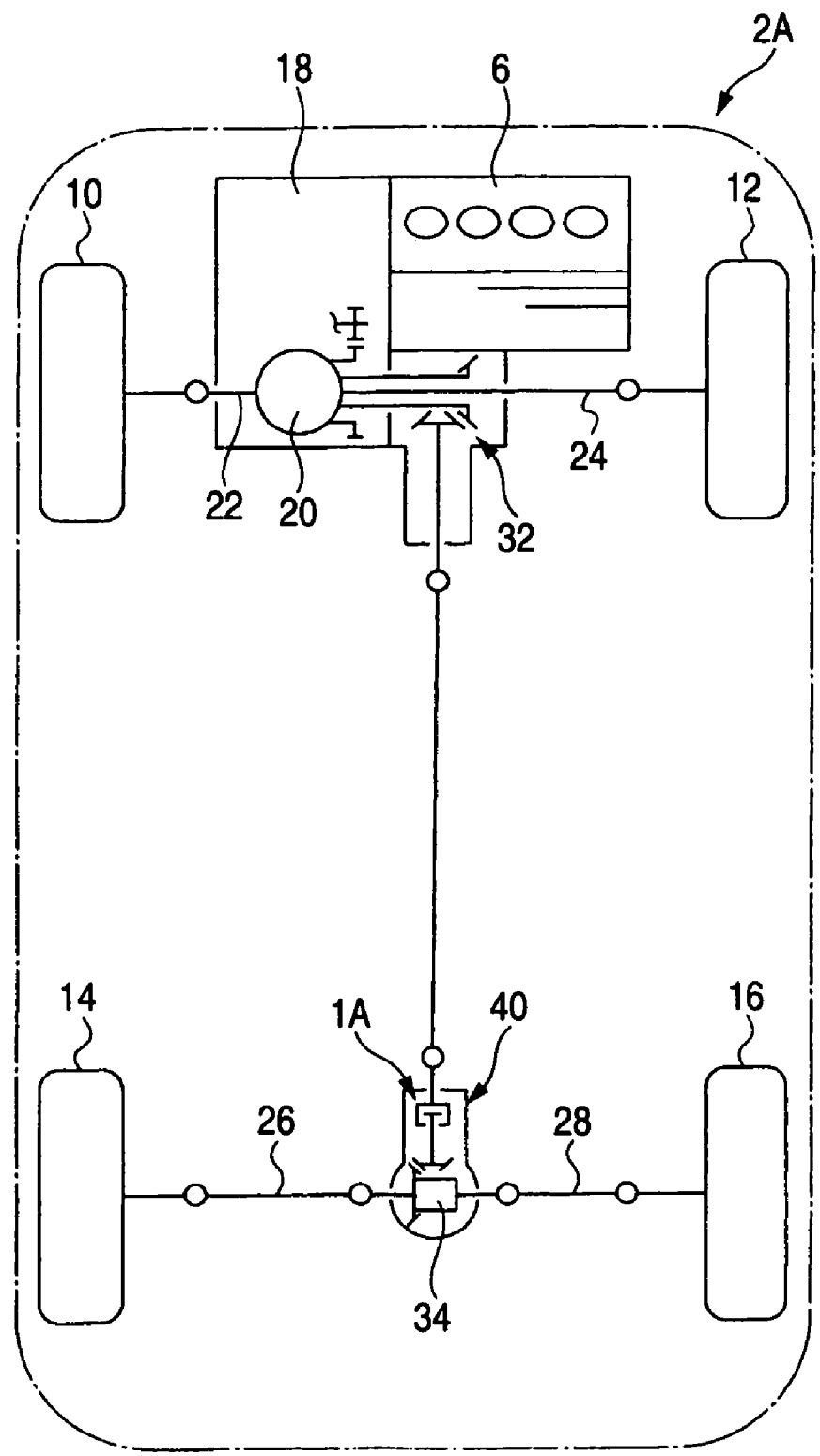
FIG. 5 is a plan view illustrating a skeleton of a four wheel vehicle (second embodiment).

As shown in FIG. 5, a coupling 1A that is a friction engaging device of a car 2A transmits a drive force from an engine 6 to a rear differential device 34. That is, a drive force is transmitted to front right and left wheels 10 and 12 through a front differential device 20 and right and left axle shafts 22 and 24 from the engine 6. Further, a drive force is transmitted to the coupling 1A through the pair of direction conversion gears 32 from the differential case of the front differential device 20. The differential device 34 is disposed in a housing 40 individually and separately mounted from a housing accommodating the transmission 18 adjacent to the engine 6.

The coupling 1A is similarly structured with the applying/releasing device 7 in the first embodiment. The coupling 1A of the second embodiment is structured by an outer rotational member 3 (an outer member 3), an inner rotational member 5 (an inner member 5), outer plate 31 rotated with the outer rotational 3, and inner plate 33 rotated with the inner rotational member 5, so as to constitute the friction engaging device. Descriptions about the detailed structures of the friction engaging device of the second embodiment which would be repeat with that of the first embodiment are omitted.

Therefore, in the car 2A, by means of the output of engine 6, on the one hand, the front wheels 10 and 12 are driven through the front differential device 20 and the right and left axle shafts 22 and 24 from a transmission 18. Further, on the other hand, the rear right and left wheels 14 and 16 are driven through the pair of direction conversion gears 32, the coupling 1A, the rear differential device 34, and the right and left axle shafts 26 and 28 from the front differential device 20.

The outer plate and the inner plate of the coupling 1A are friction engaging members which are friction-engaged with each other, and one thereof is a friction plate formed of a steel product, for example, the SC tempered material and the other thereof is the friction plate having a paper attached as the friction member on the surface thereof.

Each of the outer plates is subjected to surface treatment and a surface layer for suppressing chemical adsorption of a friction adjuster is formed on the plate surface. The surface treatment is nitriding treatment of the surface of the outer plate 31 after grinding, in order to suppress chemical adsorption of a friction adjuster (FM material).

By the above construction, it is possible to obtain almost the same operation and effect as that of the first embodiment in the coupling 1A of the present embodiment.

Further, a friction engaging member whose surface is subjected to surface treatment can be applied to friction engaging devices for differential limitation such as a center differential device, a front differential device, etc.

If the formation of the surface layer is for suppressing chemical adsorption of the friction adjuster, other surface treatment employing many methods known as the surface treatment than nitriding treatment can be applied. A friction material is not limited to a paper, but it may be a carbon facing.

The friction engaging member is not limited to a plate and it is not particularly limited to shapes such as a flat, a cone shape, or the like, as long as it has a surface for friction engaging. As other special examples, one way or two way clutch-type friction engaging members employing a roller or a sprag is taken into account. In this case, the friction engaging member is provided on a surface of the roller or the sprag or an engaging surface of the corresponding side.

Further, in a case where an actuator is used, the friction engaging member employing an electric motor, a fluid pump, or a hydraulic piston and a cylinder instead of an electromagnet is taken into account.

If the friction engaging member according to the present invention is applied to one and the other plate, the friction material of the other plate may be not used.

Further, the friction engaging device according to the present invention is applicable to a both wheels clutch in which the driving torque from the driving source is individually transmitted to the right wheel and left wheel.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A friction engaging device, comprising:
    a pair of friction engaging members used under a lubricated environment of a lubricant containing a friction adjuster and frictionally engaged with each other; and
    an adsorption suppressing surface layer formed on at least one of the friction engaging members configured to suppress chemical adsorption of the friction adjuster,
    wherein the one of the friction engaging members is formed of a steel product, and both the surface layer and a base material of the steel product contain an iron component,
    a content of the iron component of the surface layer is lower than a content of the iron component of the base material, and
    the surface layer is formed by applying a surface treatment after grinding the at least one of the friction engaging member.

2. The friction engaging device according to claim 1, wherein the surface treatment is nitriding treatment.

3. The friction engaging device according to claim 1, further comprising:
    an actuator;
    a pilot clutch actuated by the actuator;
    a cam configured to generate a thrust force by operating the pilot clutch; and
    a main clutch operated by the thrust force of the cam,
    wherein the pair of friction engaging members are provided in the main clutch.

4. The friction engaging device according to claim 1, wherein the friction engaging device is accommodated in a case of a differential device driven by a sub-driving source.

5. The friction engaging device according to claim 1, wherein the friction engaging device is a coupling arranged in an input side of a final reducer of a differential device.

6. The friction engaging device according to claim 1, wherein the friction engaging device is mounted in a driving path of a vehicle, and
    the friction engaging members are provided to apply or release the driving torque between a pair of rotation members in the input/output side of the drive path.

7. The friction engaging device according to claim 6, wherein the pair of rotation members comprise an outer member and an inner member, the outer member and the inner member are relatively rotatable, and the friction engaging device applies or releases the driving torque in a differential device.

8. The friction engaging device according to claim 7, wherein the outer member is an outer differential case of the differential device and the inner member is an inner differential case of the differential device.

9. The friction engaging device according to claim 6, wherein the one of the friction engaging members is a friction plate formed of the steel product and the other of the friction engaging members is a friction plate having a friction material on the surface thereof.

10. The friction engaging device according to claim 6, wherein the friction engaging device is disposed in an individual housing separately mounted from a housing adjacent to an engine on the vehicle, and the friction engaging device is mounted in a differential device that transmits the driving torque to an auxiliary driven wheel.

11. A friction engaging device, comprising:
    a first friction engaging member formed of a steel product;
    a second friction engaging member, wherein the first friction engaging member and the second friction engaging member are relatively rotatable; and
    a surface layer formed on the first friction engaging member and treated by nitriding treatment after grinding the first friction engaging member,
    wherein both the surface layer and a base material of the first friction engaging member contain an iron component, and
    a content of the iron component of the surface layer is lower than a content of the iron component of the base material.

12. The friction engaging device according to claim 11, further comprising:
    an actuator;
    a pilot clutch actuated by the actuator;
    a cam configured to generate a thrust force by operating the pilot clutch; and
    a main clutch operated by the thrust force of the cam,
    wherein the first friction engaging member is provided in the main clutch.

13. The friction engaging device according to claim 11, wherein the friction engaging device is accommodated in a case of a differential device driven by a sub-driving source.

14. The friction engaging device according to claim 11, wherein the friction engaging device is a coupling arranged in an input side of a final reducer of a differential device.

* * * * *